United States Patent
Decker et al.

(10) Patent No.: US 12,508,564 B2
(45) Date of Patent: Dec. 30, 2025

(54) MULTI-AUTOCLAVE LATERAL CONVERSION MODULE

(71) Applicant: Bright Sand, Inc., Chattanooga, TN (US)

(72) Inventors: Earl R Decker, Windsor (CA); Gregory F Decker, Windsor (CA)

(73) Assignee: Bright Sand, Inc., Detroit, MI (US)

( * ) Notice: Subject to any disclaimer, the term of this patent is extended or adjusted under 35 U.S.C. 154(b) by 931 days.

(21) Appl. No.: 17/450,028

(22) Filed: Oct. 5, 2021

(65) Prior Publication Data

US 2022/0126249 A1 Apr. 28, 2022

Related U.S. Application Data

(60) Provisional application No. 63/087,843, filed on Oct. 5, 2020.

(51) Int. Cl.
*B01J 12/00* (2006.01)
*B01F 25/31* (2022.01)
(Continued)

(52) U.S. Cl.
CPC .............. *B01J 12/00* (2013.01); *B01F 25/311* (2022.01); *B01F 25/31322* (2022.01);
(Continued)

(58) Field of Classification Search
CPC .............. B01F 25/311; B01F 25/31322; B01F 2101/2204; B01J 2219/00894
(Continued)

(56) References Cited

U.S. PATENT DOCUMENTS

| 4,509,434 A | 4/1985 | Boday et al. |
| 8,715,582 B1 * | 5/2014 | Decker .................. C01B 32/39 |
| | | 422/204 |

(Continued)

FOREIGN PATENT DOCUMENTS

| CN | 202092129 U | 12/2011 |
| DE | 4301779 A1 | 7/1994 |
| JP | 2002295812 A | 10/2002 |

OTHER PUBLICATIONS

International Search mailed May 6, 2022 in corresponding PCT/US2021/053654 (6 pages).

*Primary Examiner* — Christine T Mui
(74) *Attorney, Agent, or Firm* — Capitol City TechLaw, PLLC; Samuel P. Burkholder

(57) ABSTRACT

A multi-autoclave lateral conversion module includes a central mixing process pipe having first and second terminal ends, a heating unit providing heated air at the first terminal end of the central mixing process pipe, two or more gas injection units connected to opposing sides of the central mixing process pipe at a first addition point located between the first and the second terminal ends, and each gas injection unit receiving the process discharge gas from an autoclave unit. The process discharge gas is transmitted from an autoclave unit through the gas injection unit into the central mixing process pipe where it mixes with the process discharge gas from the other autoclave unit, and then the mixed process gases are converted. Process units other than autoclaves can also utilize the module and method provided.

5 Claims, 5 Drawing Sheets

(51) Int. Cl.
  *B01F 25/313* (2022.01)
  *B01F 101/00* (2022.01)
(52) U.S. Cl.
  CPC . *B01F 2101/2204* (2022.01); *B01J 2204/002* (2013.01); *B01J 2219/00894* (2013.01)
(58) Field of Classification Search
  USPC .......................................................... 422/186
  See application file for complete search history.

(56) References Cited

U.S. PATENT DOCUMENTS

2007/0289216 A1    12/2007   Tsangaris et al.
2022/0107086 A1     4/2022   Decker et al.

* cited by examiner

MULTI-AUTOCLAVE LATERAL CONVERSION MODULE

RELATED APPLICATIONS

The present application claims benefit from earlier filed U.S. Provisional Application No. 63/087,843, filed Oct. 5, 2020, which is incorporated by reference in its entirety for all purposes.

BACKGROUND

Field of Invention

The present disclosure relates to a process and equipment to improve the efficiency on various levels of conversion devices and processes.

Discussion of the Related Art

There are numerous industrial processes that produce high temperature process gas, including, for example, gasification processes, vapor conversion, pyrolysis, furnaces, kilns, and heaters. Manufacturing processes that involve glass, metal, and ceramic materials are just a few instances of processes that consume large amounts of resources and produce high temperature process or waste gas. Concurrently there is an abundance of municipal solid waste ("MSW"), commercial waste, and industrial waste that needs to be processed in the most energy efficient manner while also breaking down any pollutants or biohazards present in the waste.

Equipment and processes that combine the decomposition of solid waste with the reprocessing of waste process gas, and produce energy are of great interest to both producers and consumers of energy and waste materials.

SUMMARY OF THE DISCLOSURE

The presently disclosed multi-autoclave lateral conversion module includes a central mixing process pipe having first and second terminal ends, a heating unit providing heated air at the first terminal end of the central mixing process pipe, two or more gas injection units connected to opposing sides of the central mixing process pipe at a first addition point located between the first and the second terminal ends, and each gas injection unit receiving the process discharge gas from an autoclave unit. The process discharge gas is transmitted from an autoclave unit through the gas injection unit into the central mixing process pipe where it mixes with the process discharge gas from the other autoclave unit, and then the mixed process gases are converted.

Also taught by the present disclosure is a method of converting process gas by providing a central mixing process pipe having first and second terminal ends, providing a heating unit supplying heated air at the first terminal end of the central mixing process pipe, providing two or more gas injection units connected to opposing sides of the central mixing process pipe at a first addition point located between the first and the second terminal ends, and each gas injection unit receiving process gas from a processing unit. The process gas is transmitted from the processing unit through the gas injection unit into the central mixing process pipe where it mixes with the process gas from the other processing unit, and then the mixed process gases are converted.

The present disclosure provides both a multi-fuel isolated impulse burner module and a multi-autoclave lateral combustion module ("MALCM") which can be used individually or in combination to provide a more efficient combustion process.

The multi-fuel isolated impulse burner module can be used as an ignition module for starting a thermal cycle in an autoclave used, for example, to thermally decompose municipal solid waste. The multi-fuel isolated impulse burner module can also be the main burner for the presently disclosed multi-autoclave lateral combustion module.

The burner module allows for the air and fuel nozzle assembly to be changed to allow for alternate fuel sources, such as, diesel, propane, natural gas, kerosene, biofuels, and other energy sources.

Among other features of the burner module: air can be flowed continuously and/or pulsed, and an air tank can be used to hold a volume of air at a lower pressure than supplied plant air. The purpose of the air tank is to provide the capability of adding a larger volume of air at a lower pressure and lower velocity. One embodiment of the burner module is illustrated in FIG. 5.

The presently disclosed method and conversion module can be used with a wide variety of feedstocks, including MSW, commercial waste, industrial waste, agricultural waste, medical waste, tires, and more. Of particular interest is medical waste which may contain pathogens that need to be destroyed or deactivated in the process. It is believed that the presently disclosed system and equipment would produce a combustion zone providing temperature and time to break down any and all pathogens, including viruses and prions. Typically, exposure to an environment of 1000° C. for sufficient time, typically at least 0.5 seconds will significantly denature prion proteins and destroy prion infectivity.

This disclosure includes a multi-autoclave lateral conversion module having a main purpose of the conversion module is to combine the gas streams from two or more autoclaves, or other generators, of process gas into a central conversion unit. The conversion module is designed to efficiently convert the process gas from autoclaves, or other generators, and direct that flow to a central heat exchange. The conversion module can be located laterally between the two or more autoclaves and could include from 2 to 10 Autoclave Processing Modules ("APM") on each side of the conversion module as illustrated in FIG. 3.

BRIEF DESCRIPTION OF THE FIGURES

The accompanying drawings, which are included to provide a further understanding of the invention and are incorporated in and constitute a part of this specification, illustrates preferred embodiments of the invention and together with the detailed description serve to explain the principles of the invention. In the drawings.

DETAILED DESCRIPTION

Figure 1:
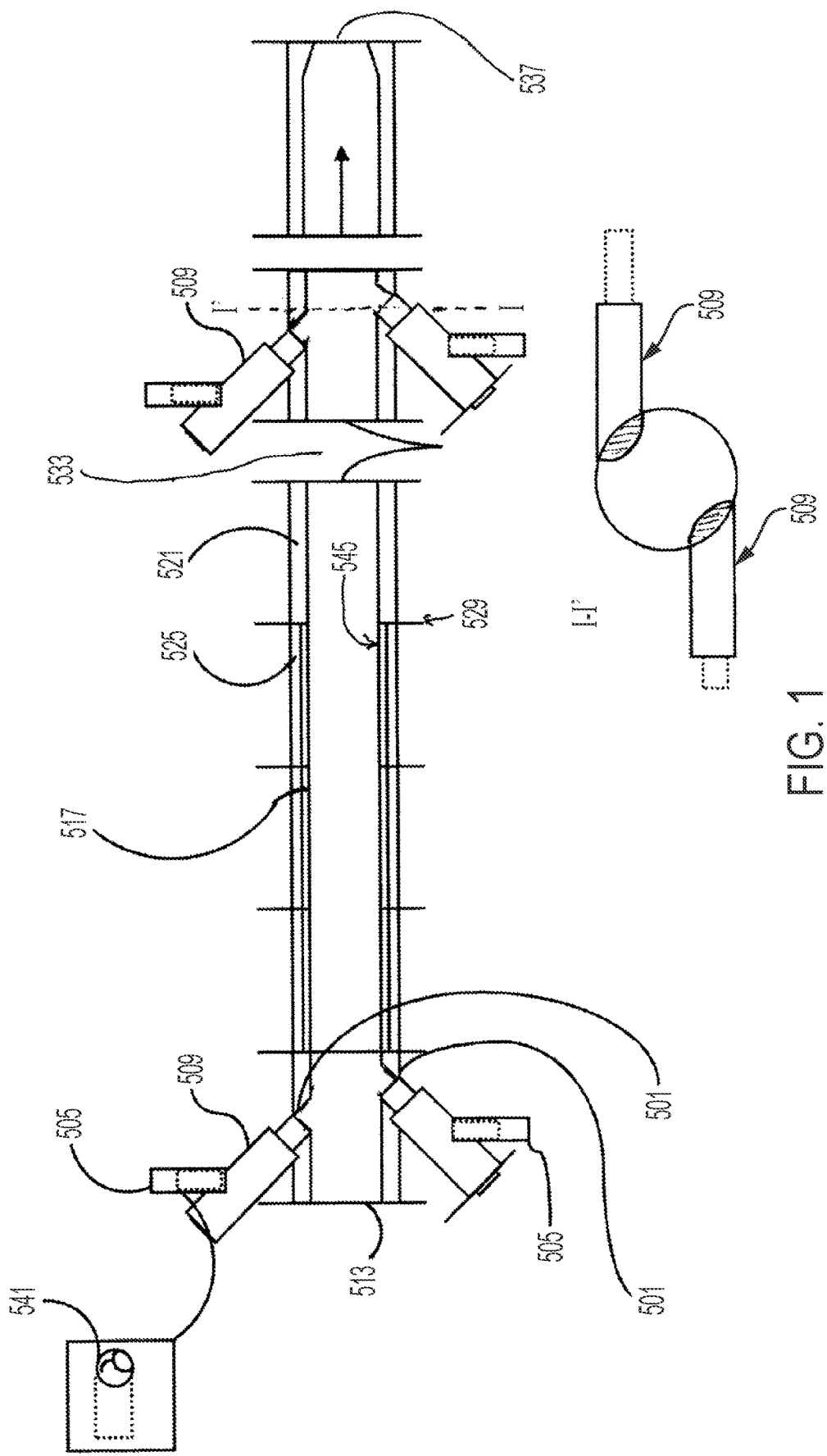
FIG. 1 is a general illustration of one embodiment of a multi-autoclave lateral conversion module.

Presently disclosed is a multi-autoclave lateral conversion module having a central mixing process pipe having first and second terminal ends, a heating unit providing heated air at the first terminal end of the central mixing process pipe, two or more gas injection units connected to opposing sides of the central mixing process pipe at a first addition point located between the first and the second terminal ends, and each gas injection unit receiving the process discharge gas from an autoclave unit. The disclosed module transmits the process discharge gas from an autoclave unit through the gas injection unit into the central mixing process pipe where it mixes with the process discharge gas from the other autoclave unit, and then mixed process gases are converted.

In some embodiments, the ignition/burner will have varying impacts on:
  a. air pattern and mixing, and
  b. volume of air to fuel-ratio of process gas temp and flow.

These factors may all be influenced by the type of fuel being used and on the targeted level of heat energy required to be produced by the process. The BTU content of the fuel may effect the other factors.

Solenoids provide shut offs for both the air and fuel inputs thus allowing the module to hold a back pressure of about 150 psi. This isolating capability, while the module is not in use, can increase the life of the burner module and associated valves.

In some embodiments, a ceramic (or other material with resistance to high temperature exposure with increased durability and structural integrity) insert has a pattern of vents equally spaced around the fuel nozzle. The vents form the air into a circular pattern to provide more complete thorough mixing of air and fuel. In some embodiments, the vents can be replaced by holes or channels formed in the ceramic insert. The channels can be curved so that the air is swirling as it exits and mixes with the fuel.

In some embodiments, the burner module can be manufactured from pieces which are constructed using 3D printing technology using suitable alloys, ceramics, composites, and other material compositions.

For each autoclave unit, the gas injection unit of each autoclave unit further comprises an air injection unit. The addition of the process gas occurs with the addition of air at the gas injection unit to ensure that positive pressure to drive the process gas into the central mixing process pipe.

For the disclosed conversion module, wherein the second terminal end of the central mixing process pipe is connected to a heat exchanger and gas scrubber. The aftertreatment of the converted gas will depend on the initial components of the discharge gas and its properties.

When the process discharge gas of multiple autoclaves or processing units is to be treated by the conversion module the process discharge gas of additional autoclaves can be added to central mixing process pipe. The process discharge gas of additional autoclaves can be added at an appropriate distance down the central mixing process pipe from the first addition point. Again, the properties of the discharge gas, the temperature and pressure of the treatment process, and the targeted treatment will determine where the discharge gas should enter the module.

As needed to add additional autoclaves or processing units, the conversion module, can have central mixing process pipe can be lengthened by the addition of pipe between the first addition point and the second terminal end. In some embodiments, it may not be necessary to add additional central mixing process pipe.

Also taught herein is a method of converting process gas by providing the conversion module described herein, specifically providing a central mixing process pipe having first and second terminal ends; providing a heating unit supplying heated air at the first terminal end of the central mixing process pipe, and providing two or more gas injection units connected to opposing sides of the central mixing process pipe at a first addition point located between the first and the second terminal ends, and each gas injection unit receiving process gas from a processing unit. At this step in the process, the process gas is transmitted from the processing unit through the gas injection unit into the central mixing process pipe where it mixes with the process gas from the other processing unit, and the mixed process gases are converted.

For the present conversion method, the gas injection unit of each processing unit can further include an air injection unit.

In this conversion method, the second terminal end of the central mixing process pipe is connected to a heat exchanger and gas scrubber.

Additionally, the present conversion method the process gas of additional processing units can be added to central mixing process pipe. The process gas of additional processing units can be added at an appropriate distance down the central mixing process pipe from the first addition point. Depending to the exact properties of the gases involved, the central mixing process pipe can be lengthened by the addition of pipe between the first addition point and the second terminal end.

One embodiment of the presently disclosed conversion module is represented in FIG. 1. In FIG. 1, a heater can be located at the first terminal end 513 of the central mixing process pipe 521 to provide heated air. The pipe 521 can have a ceramic liner 517 with, in some embodiments, a fiber liner 525 sandwiched between the wall 545 and the ceramic liner 517. Process gas can are added via gas injection units 509 with pressurized air added by the air injection units 505. Openings 501 in the pipe 521 can be located on opposing sides on the pipe 521, as further illustrated in detail cross-section drawing I-I'. Here a second set of inputs are provided downstream from the first addition point. Additional pipe sections 521 can be added as needed in space 533.

Figure 3:
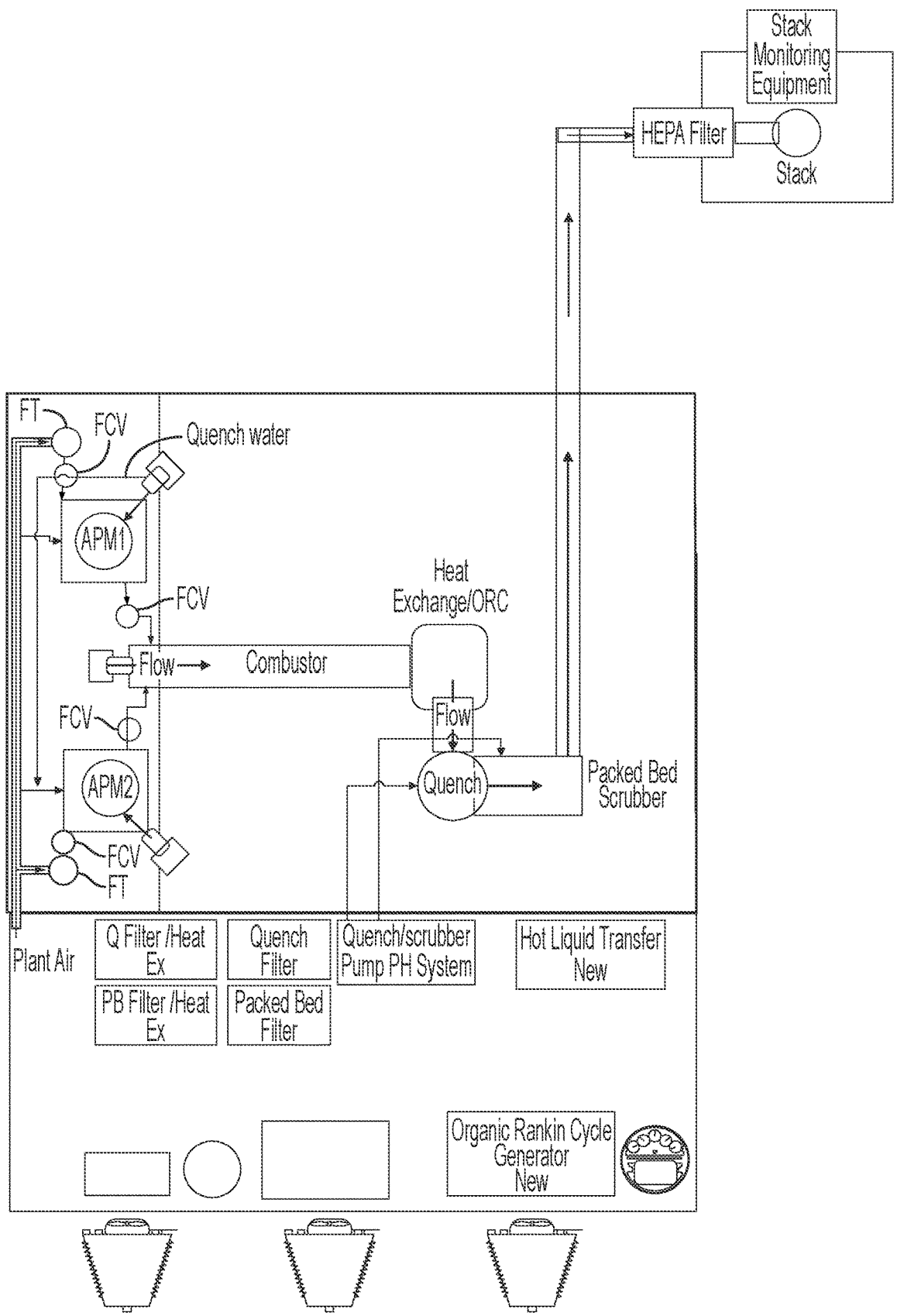
FIG. 3 is a general plant set up for a trash to energy facility.

The stylized face of a ceramic liner 517 on the air injection ports 505 is shown at 541. In some embodiments, the opening 501 can be ceramic lined and have a 3 inch internal diameter. The pipe 521 can be an 8 inch flanged ceramic lined pipe of carbon steel with a 7 inch internal diameter, as illustrated in FIG. 1. A flanged connection 529 connects two sections of pipe 521 to one another. The exit nozzle 537 can lead to further gas treatment, such as, a heat exchanger followed by, if necessary, quenching to reduce the gas temperature prior to gas scrubber treatment, as shown in FIG. 3.

Figure 2D:
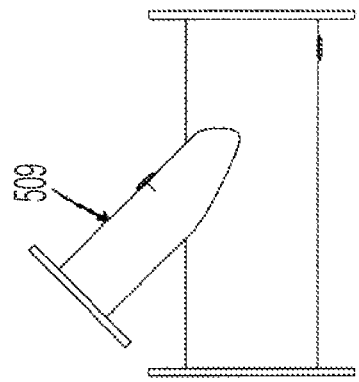
FIG. 2 are views of some aspects of the lateral conversion module.
Figure 2C:
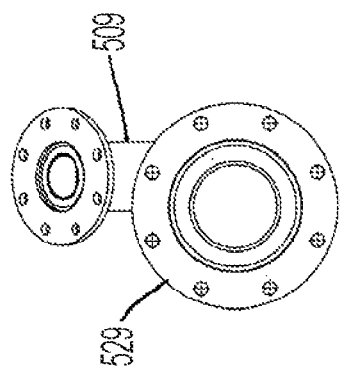
Figure 2A:
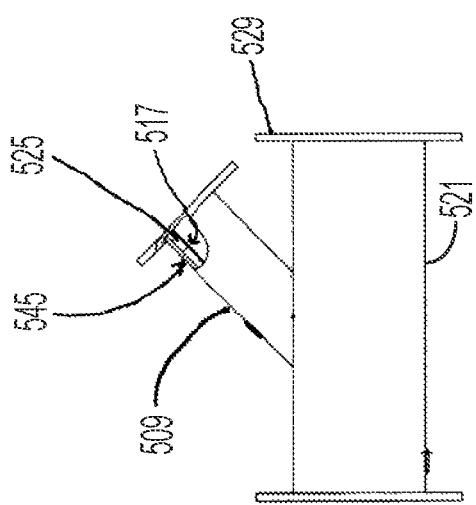
Figure 2B:
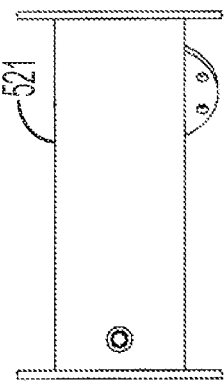

The structure of the pipe 521 is detailed in FIG. 2A with a ceramic liner 517 lining the interior of the pipe 521, then a fiber liner 525 sandwiched between the wall 545 and the ceramic liner 517. This construction provides improved heat retention for the process gas. The pipe 521 can in some instances be considered to be a radiant chamber in which conversion of the process gas can occur. FIGS. 2B, 2C, and 2D illustrate one embodiment of how the gas injection units 509 are located on the pipe 521.

Figure 4:
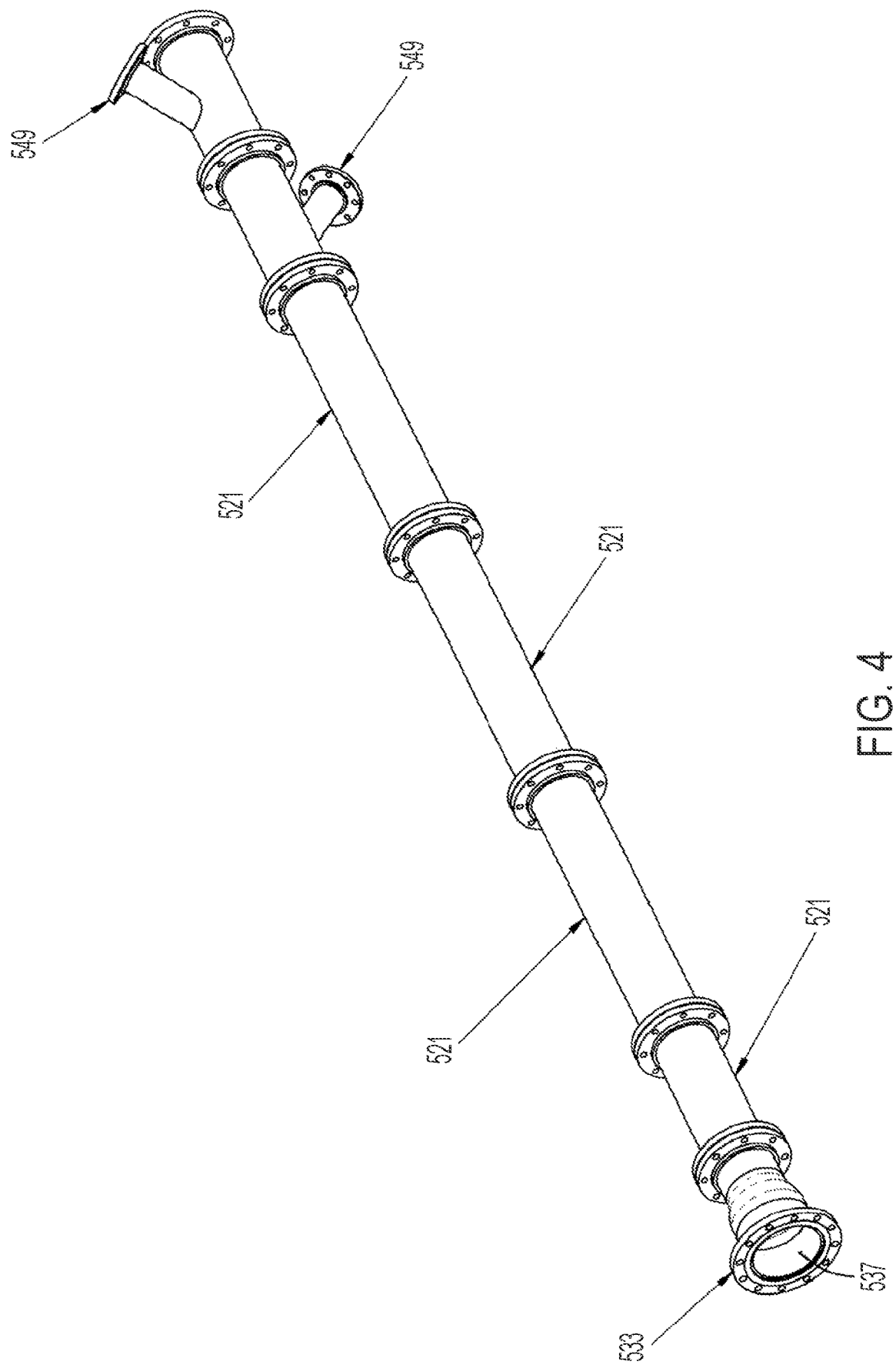
FIG. 4 is an illustration of one non-limiting embodiment of a central mixing process pipe of an autoclave lateral conversion module as disclosed herein.
Figure 5:
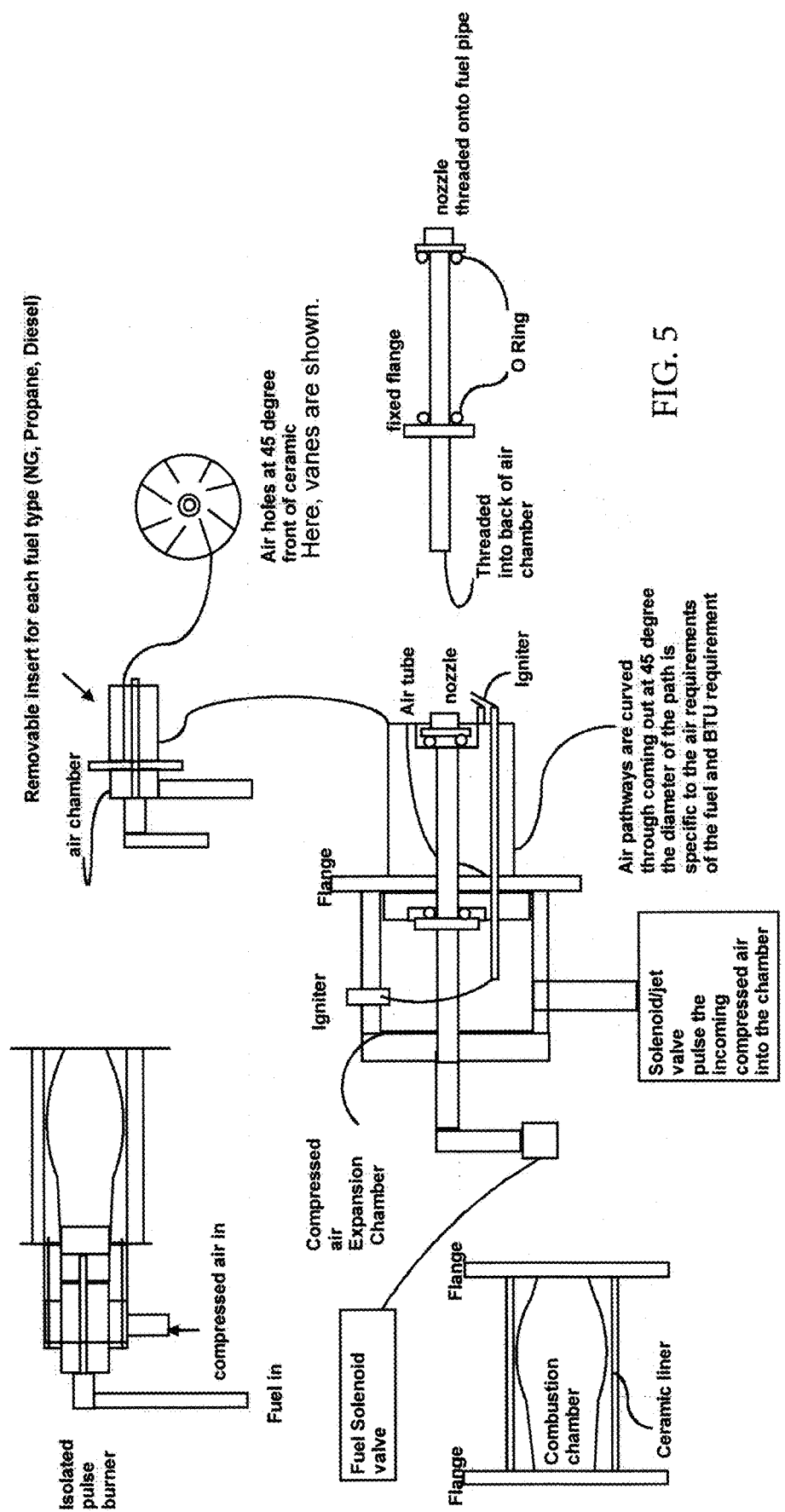
FIG. 5 is a general illustration of one embodiment of an impulse burner module. The dimensions provided in FIG. 1

As shown in FIG. 1, in some embodiments have two gas injection units located on opposing sides of the same pipe section. In other embodiments as illustrated in FIG. 4, the couplings 549 for the gas injection units are located on the opposing sides of adjoining pipe sections.

In some embodiments of the conversion module, the diameter of the pipe 521 will vary with increases in the internal pipe diameter as more processing gas from autoclave or processing units are added. In some cases, an initial section of the pipe 521 will be one diameter, and will increase downstream as more units are added.

The conversion module is, among other things, designed to enhance mixing of the process gases through a rotating stream, provides a concentrated heat source for the heat exchange unit, provides a radiant chamber to increase resonance time for mixing and conversion, and serves as a conversion chamber for the autoclave process gas.

The disclosed systems can be used to increase efficiency of process gas conversion to increase the energy extracted, the energy output, from the process gas. This increased heat or energy output can be used with a heat exchanger to provide an increase in the energy output (or decrease the overall energy consumption) of a process or plant. One such process is the conversion of waste material, in numerous forms, to energy, also in numerous forms.

The presently disclosed conversion modules provide the following unique features including, without being limited thereto: adding continuous flow or impulse injected air to complete conversion, a radiant chamber having a liner capable of retaining heat and radiating back into chamber, using a heater module to provide initial startup heat, providing heat for generation in the event the autoclaves are not functioning, and providing additional heat as required during process cycling.

In some embodiments, the presently disclosed conversion module can include a radiant chamber between autoclaves in multiple configurations, with the chamber diameter sized for the number of APM feeding into the conversion module, and the length of the radiant chamber can be added and or subtracted depending on the feedstock and time required for conversion and efficiency of the process.

The presently disclosed conversion module can be comprised of multiple processing zones. Each processing zone can be composed of the above-disclosed burner module, a lateral zone with each lateral zone providing two autoclave process gas entry ports, then a radiant chamber of varying length, and finally an exit nozzle.

In the case where more than two APMs feed into the conversion module an additional processing zone with corresponding length of radiant chamber can be added prior to the exit to the heat exchanger. As additional APMs are added, then additional processing zones can be added for each pair of APMs added.

In some instances, the radiant chamber can be composed of multiple sections of pipe typically lined with heat radiant and/or heat retaining material. The number of sections will vary depending on various factors including the fuel type, the energy content of the autoclave process gas, the amount of fuel added by the burner module, the desired amount of heat produced by the process, and the targeted temperatures for the various stages of the process including the temperature of the exit gas.

The positioning angle of various process lines intersecting the conversion chamber, flow pattern, air injection will be computed using CFD ("computational fluid dynamic") analysis, and in some cases for various fuel BTU levels.

An autoclave suitable for used along with the presently disclosed apparatus can include the vessels generally described in the applicant's prior patents, U.S. Pat. No. 8,715,582 B2, and U.S. Pat. No. 11,098,251 B2, the disclosures of which are incorporated by reference herein in their entirety for all purposes.

All publications, articles, papers, patents, patent publications, and other references cited herein are hereby incorporated by reference herein in their entireties for all purposes.

Although the foregoing description is directed to the preferred embodiments of the present teachings, it is noted that other variations and modifications will be apparent to those skilled in the art, and which may be made without departing from the spirit or scope of the present teachings. The provided figures are not to scale, and the angles between various members of the apparatus are merely illustrative.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A multi-autoclave lateral conversion module comprising:
   a central mixing process pipe having first and second terminal ends;
   a heating unit providing heated air at the first terminal end of the central mixing process pipe;
   two or more gas injection units with accompanying air injection units connected to opposing sides of the central mixing process pipe at a first addition point located between the first and the second terminal ends, and
   each gas injection unit receiving a process discharge gas from a first autoclave unit,
   wherein the process discharge gas is transmitted from the first autoclave unit through the gas injection unit into the central mixing process pipe where the process discharge gas mixes with the process discharge gas received from a second autoclave unit, and
   the mixed process gases are converted.

2. The conversion module according to claim 1, wherein the second terminal end of the central mixing process pipe is connected to a heat exchanger and gas scrubber.

3. The conversion module according to claim 1, wherein the process discharge gas of additional autoclaves can be added to central mixing process pipe.

4. The conversion module according to claim 3, wherein the process discharge gas of additional autoclaves is added at a distance down the central mixing process pipe from the first addition point.

5. The conversion module according to claim 1, wherein additional mixing process pipe can be added between the first addition point and the second terminal end.

* * * * *